US012602132B2

(12) United States Patent
Weng

(10) Patent No.: US 12,602,132 B2
(45) Date of Patent: Apr. 14, 2026

(54) DISPLAY DEVICE

(71) Applicant: CARUX TECHNOLOGY PTE. LTD.,
Singapore (SG)

(72) Inventor: Tsan-Po Weng, Tainan (TW)

(73) Assignee: CARUX TECHNOLOGY PTE. LTD.,
Singapore (SG)

( * ) Notice: Subject to any disclaimer, the term of this
patent is extended or adjusted under 35
U.S.C. 154(b) by 0 days.

(21) Appl. No.: 18/894,005

(22) Filed: Sep. 24, 2024

(65) Prior Publication Data

US 2025/0138674 A1      May 1, 2025

Related U.S. Application Data

(60) Provisional application No. 63/594,028, filed on Oct.
29, 2023.

(30) Foreign Application Priority Data

Aug. 1, 2024    (CN) .......................... 202411051501.2

(51) Int. Cl.
*G06F 3/041* (2006.01)
*G06F 3/044* (2006.01)
(52) U.S. Cl.
CPC ........ *G06F 3/041662* (2019.05); *G06F 3/044*
(2013.01)

(58) Field of Classification Search
CPC ................................. G06F 3/041; G06F 3/044
USPC .................................................. 345/173–174
See application file for complete search history.

(56) References Cited

U.S. PATENT DOCUMENTS

| | | | |
|---|---|---|---|
| 10,409,417 B2* | 9/2019 | Noguchi ............. | G02F 1/13338 |
| 2014/0002410 A1* | 1/2014 | Lillie .................... | G06F 3/0443 |
| | | | 345/174 |
| 2014/0168142 A1* | 6/2014 | Sasselli .................. | G06F 3/044 |
| | | | 345/174 |
| 2018/0164946 A1* | 6/2018 | Noguchi .............. | G06F 3/0445 |

FOREIGN PATENT DOCUMENTS

JP          2017016560 A  *  1/2017  ........... G06F 3/0446

* cited by examiner

*Primary Examiner* — Kwin Xie
(74) *Attorney, Agent, or Firm* — JCIPRNET

(57) ABSTRACT

An electronic device is provided. The electronic device
includes a control circuit and a plurality of sensing units. The
control circuit switches between a first touch sensing mode
and a second touch sensing mode of the electronic device. A
first amplitude of a first touch driving signal provided by the
control circuit operating in the first touch sensing mode is
smaller than a second amplitude of a second touch driving
signal provided by the control circuit operating in the second
touch sensing mode.

16 Claims, 12 Drawing Sheets

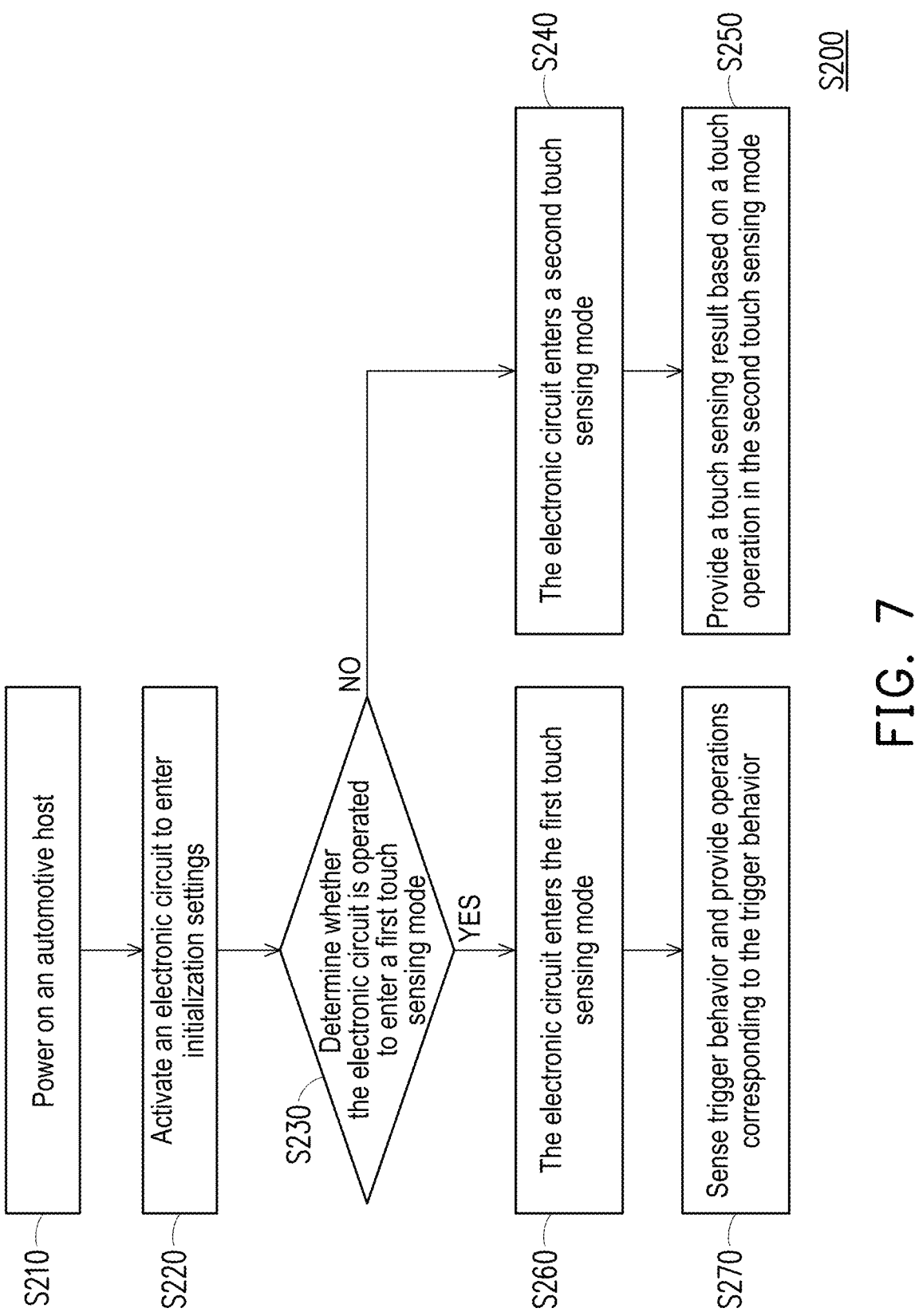

S210 — Power on an automotive host

S220 — Activate an electronic circuit to enter initialization settings

S230 — Determine whether the electronic circuit is operated to enter a first touch sensing mode

NO

S240 — The electronic circuit enters a second touch sensing mode

S250 — Provide a touch sensing result based on a touch operation in the second touch sensing mode

YES

S260 — The electronic circuit enters the first touch sensing mode

S270 — Sense trigger behavior and provide operations corresponding to the trigger behavior

DISPLAY DEVICE

CROSS-REFERENCE TO RELATED APPLICATION

This application claims the priority benefit of U.S. provisional application Ser. No. 63/594,028, filed on Oct. 29, 2023, and China application serial no. 202411051501.2, filed on Aug. 1, 2024. The entirety of each of the above-mentioned patent applications is hereby incorporated by reference herein and made a part of this specification.

BACKGROUND

Technical Field

The disclosure relates to an electronic device; more particularly, the disclosure relates to an electronic device with touch sensing functionality.

Description of Related Art

Electronic devices may have touch sensing functionality. Typically, an electronic device enters a sleep state and may wake up from the sleep state to a normal state based on touch behavior, subsequently performing touch operations.

It should be noted that the electronic device continuously provides touch sensing signals at the same frequency whether in the sleep state or the normal state. Therefore, when transitioning to the normal state, the touch behavior may experience a missed pulse of the touch sensing signal, which may cause a latency in the touch operations (e.g., a latency of one cycle of the touch sensing signal).

SUMMARY

The disclosure is directed to an electronic device that may shorten the latency of touch operations.

According to an embodiment of the disclosure, an electronic device includes a control circuit and a plurality of sensing units. The control circuit switches between a first touch sensing mode and a second touch sensing mode of the electronic device. The sensing units are electrically connected to the control circuit. A first amplitude of a first touch driving signal provided by the control circuit operating in the first touch sensing mode is smaller than a second amplitude of a second touch driving signal provided by the control circuit operating in the second touch sensing mode.

In light of the above, the first touch driving signal provided by the control circuit operating in the first touch sensing mode is different from the second touch driving signal provided in the second touch sensing mode. Upon entry into the second touch sensing mode, the second touch driving signal is provided anew. Therefore, touch behavior occurring immediately after entering the second touch sensing mode does not experience a missed pulse of the second touch driving signal. As a result, the electronic device provided in one or more embodiments of the disclosure may shorten the latency of touch operations. Moreover, the first amplitude of the first touch driving signal is smaller than the second amplitude of the second touch driving signal. Consequently, the power consumption of the electronic device in the first touch sensing mode is lower than the power consumption of the electronic device in the second touch sensing mode.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7 is an operation flowchart illustrated according to an embodiment of the disclosure.

DETAILED DESCRIPTION OF DISCLOSED EMBODIMENTS

Figure 1:
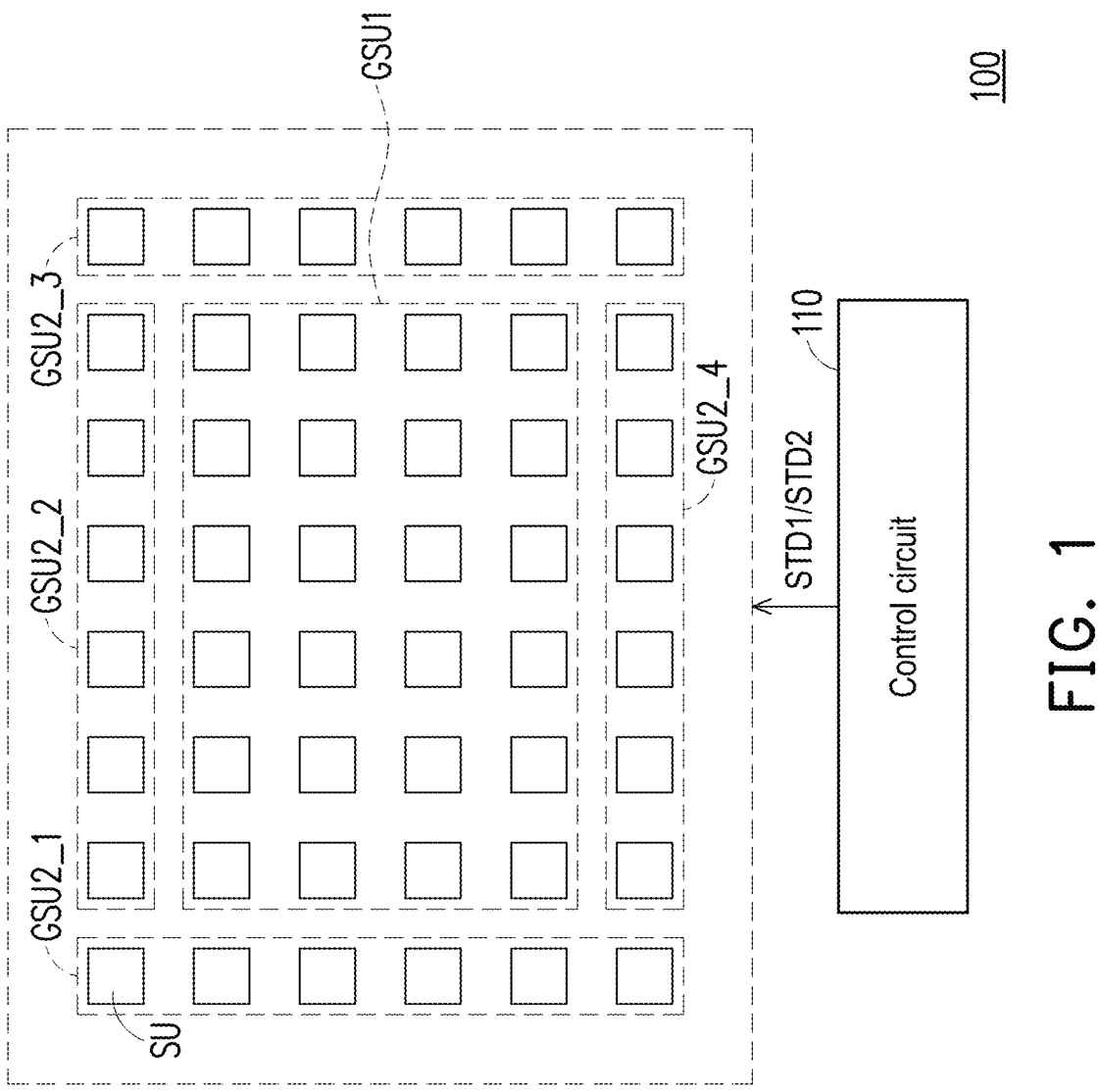
FIG. 1 is a schematic view of an electronic device illustrated according to an embodiment of the disclosure.

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings simply serve for exemplifying instead of limiting the scope of the disclosure.

Certain terminologies are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terminologies such as "include", "comprise", and "have" are used in an open-ended manner, and thus should be interpreted as "including, but not limited to". Therefore, the terminologies "include", "comprise", and/or "have" used in the description of the disclosure denote the presence of corresponding features, regions, steps, operations, and/or elements but are not limited to the presence of one or more corresponding features, regions, steps, operations, and/or elements.

It should be understood that when one element is referred to as being "coupled to", "connected to", or "conducted to" another element, the one element may be directly connected to the another element with electrical connection established, or intervening elements may also be present in between these elements for electrical interconnection (indirect electrical connection). Comparatively, when one element is referred to as being "directly coupled to", "directly conducted to", or "directly connected to" another element, no intervening components are present in between.

Although terminologies such as first, second, and third may be used to describe different diverse constituent elements, such constituent elements are not limited by the terminologies. The terminologies are used to discriminate one constituent element from other constituent elements in the description. In the claims, the terminologies first, second, third, and so on may be used in accordance with the order of claiming elements instead of using the same terminologies. Accordingly, a first constituent element in the following description may be a second constituent element in the claims.

The electronic device provided in the disclosure may include but is not limited to a display device, an antenna device, a sensing device, a light-emitting device, a touch display, a curved display, or a free-shape display. The electronic device may include a bendable or flexible electronic device. The electronic device may include, for instance, liquid crystal, light emitting diode (LED), quantum dot (QD), fluorescence, phosphor, other suitable display media, or a combination thereof, which should however not be construed as a limitation in the disclosure. The LED may include, for instance, an organic light-emitting diode (OLED), a mini LED, a micro LED, a quantum dot LED (including QLED and QDLED), other suitable materials, or a combination thereof, which should however not be construed as a limitation in the disclosure. The display device may, for instance, include a tiled display device, which should however not be construed as a limitation in the disclosure. The antenna device may, for instance, include a liquid crystal antenna, which should however not be construed as a limitation in the disclosure. The antenna device may, for instance, include a tiled antenna device, which should however not be construed as a limitation in the disclosure. Note that the electronic device may be any arrangement or combination of the above, which should however not be construed as a limitation in the disclosure. In addition, the shape of the electronic device may be a rectangle, a circle, a polygon, a shape with a curved edge, or other suitable shapes. The electronic device may have a peripheral system, for instance, a driving system, a control system, or a light source system, to support the display device, the antenna device, or the tiled device, which should however not be construed as a limitation in the disclosure. The sensing device may include a camera, an infrared sensor, or a fingerprint sensor, and the disclosure is not limited thereto. In some embodiments, the sensing device may also include a flash, an infrared (IF) light source, other sensors, electronic elements, or a combination thereof, which should however not be construed as a limitation in the disclosure.

In one or more embodiments of the disclosure, terminologies such as "pixel" or "pixel unit" are used as a unit for describing a specific region including at least one functional circuit for at least one specific function. The region of a "pixel" depends on the unit for providing a specific function. Adjacent pixels may share the same parts or wires, but may also include their own specific parts therein. For instance, adjacent pixels may share the same scan line or the same data line, but the pixels may also have their own transistors or capacitors.

Note that features in different embodiments described below may be replaced, recombined, or mixed with each other to form another embodiment without departing from the spirit of the disclosure.

Please refer to FIG. 1, which is a schematic view of an electronic device illustrated according to an embodiment of the disclosure. In this embodiment, an electronic device 100 may operate in one of a first touch sensing mode and a second touch sensing mode. For instance, the first touch sensing mode may be a pre-sensing mode. The second touch sensing mode may be a normal-sensing mode.

The electronic device 100 includes a control circuit 110 and a plurality of sensing units SU. The control circuit 110 switches between the first touch sensing mode of the electronic device 100 and the second touch sensing mode of the electronic device 100. The sensing units SU are electrically connected to the control circuit 110. A first amplitude provided by a first touch driving signal STD1 when the control circuit 110 operates in the first touch sensing mode is smaller than a second amplitude provided by a second touch driving signal STD2 when the control circuit 110 operates in the second touch sensing mode.

It is worth mentioning that the first touch driving signal STD1 provided when the control circuit 110 operates in the first touch sensing mode is different from the second touch driving signal STD2 provided when the control circuit 110 operates in the second touch sensing mode. Once entering the first touch sensing mode, the first touch driving signal STD1 is provided anew. Once entering the second touch sensing mode, the second touch driving signal STD2 is provided anew. Therefore, touch behavior occurring immediately after entering the second touch sensing mode does not experience a missed pulse of the second touch driving signal STD2. As such, the electronic device 100 may reduce the latency of touch operations. In addition, the first amplitude of the first touch driving signal STD1 is smaller than the second amplitude of the second touch driving signal STD2. As a result, the power consumption of the electronic device 100 in the first touch sensing mode is lower than the power consumption of the electronic device in the second touch sensing mode.

In this embodiment, in the first touch sensing mode, the control circuit 110 groups the sensing units SU into a first sensing unit group GSU1 and second sensing unit groups GSU2_1-GSU2_4. In this embodiment, the control circuit 110 in the first touch sensing mode may electrically connect a plurality of first sensing units among the sensing units SU to form the first sensing unit group GSU1. The control circuit 110 in the first touch sensing mode may electrically connect a plurality of second sensing units among the sensing units SU to form the second sensing unit group GSU2_1. The control circuit 110 in the first touch sensing mode may electrically connect a plurality of third sensing units among the sensing units SU to form the second sensing unit group GSU2_2. The control circuit 110 in the first touch sensing mode may electrically connect a plurality of fourth sensing units among the sensing units SU to form the second sensing unit group GSU2_3. The control circuit 110 in the first touch sensing mode may electrically connect a plurality of fifth sensing units among the sensing units SU to form the second sensing unit group GSU2_4. Therefore, the first sensing unit group GSU1 and the second sensing unit groups GSU2_1-GSU2_4 may be considered as five large sensing units.

In this embodiment, the second sensing unit groups GSU2_1-GSU2_4 are respectively adjacent to the first sensing unit group GSU1. For instance, the second sensing unit groups GSU2_1-GSU2_4 collectively surround the first sensing unit group GSU1 (which should however not be construed as a limitation in the disclosure).

In this embodiment, the first sensing unit group GSU1 may be a TX electrode. The second sensing unit groups GSU2_1-GSU2_4 may be RX electrodes, respectively. The control circuit 110 in the first touch sensing mode provides the first touch driving signal STD1 to the first sensing unit group GSU1. It should be noted that the first touch sensing mode may be a mutual capacitance sensing mode. In the first touch sensing mode, the first sensing unit group GSU1 and the second sensing unit groups GSU2_1-GSU2_4 may perform proximity sensing operations. Once the first sensing unit group GSU1 and the second sensing unit groups GSU2_1-GSU2_4 detect triggering behavior (such as a non-contact proximity sensing behavior or touch behavior), the control circuit 110 controls the electronic device 100 to enter the second touch sensing mode and restores the first sensing unit group GSU1 and the second sensing unit groups GSU2_1-GSU2_4 to the sensing units SU. For instance, in the second touch sensing mode, the control circuit 110 disconnects the electrical connections between the first sensing units, disconnects the electrical connections between the second sensing units, disconnects the electrical connections between the third sensing units, disconnects the electrical connections between the fourth sensing units, and disconnects the electrical connections between the fifth sensing units.

In this embodiment, the second touch sensing mode may be a self-capacitance sensing mode.

This embodiment exemplifies with five sensing unit groups, which should however not be construed as a limitation in the disclosure. The sensing unit groups provided in one or more embodiments of the disclosure may be plural in number. Each sensing unit group provided in one or more embodiments of the disclosure includes at least one sensing unit SU. The number of the sensing units SU in the first sensing unit group GSU1 and the second sensing unit groups GSU2_1-GSU2_4 should not be construed as limitations in the disclosure.

Figure 2A:
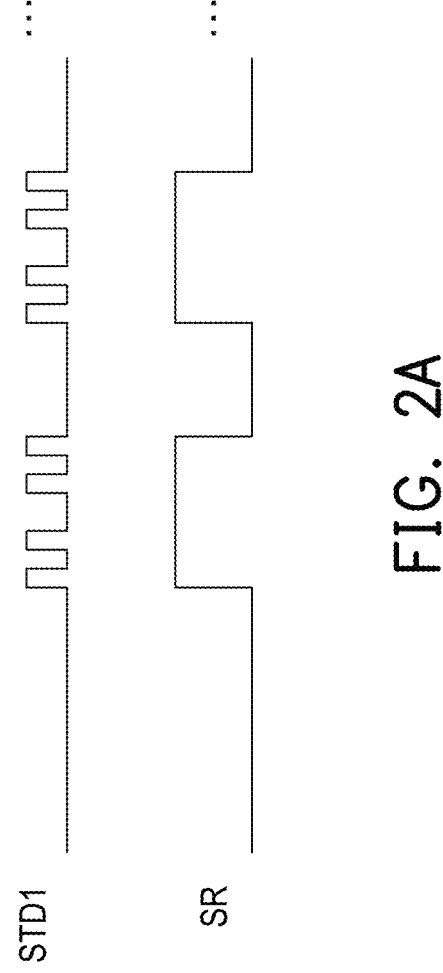
FIG. 2A, FIG. 2B, and FIG. 2C are waveform diagrams illustrated according to an embodiment of the disclosure.
Figure 2B:
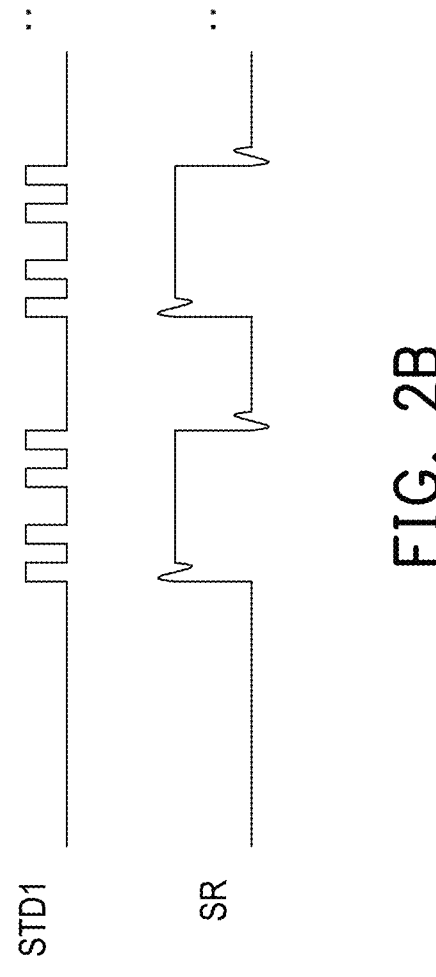
Figure 2C:
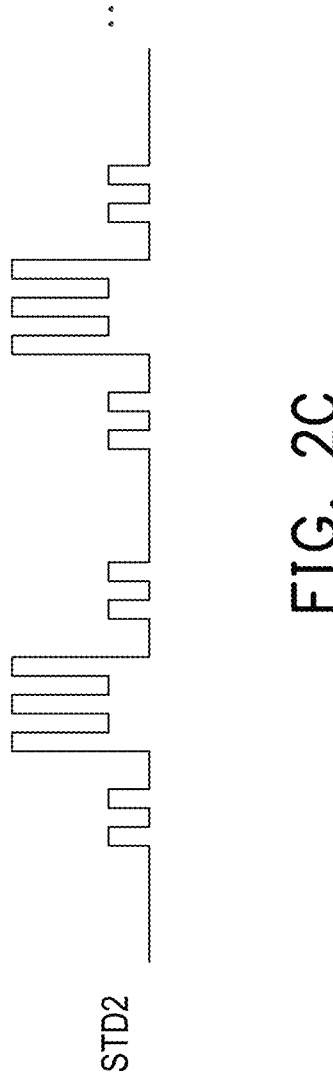

Please refer to FIG. 1, FIG. 2A, FIG. 2B, and FIG. 2C. FIG. 2A, FIG. 2B, and FIG. 2C are waveform diagrams illustrated according to an embodiment of the disclosure. In this embodiment, FIG. 2A, FIG. 2B, and FIG. 2C show waveform diagrams of the electronic device 100 in the first touch sensing mode and the second touch sensing mode. FIG. 2A shows a waveform diagram of the electronic device 100 in the first touch sensing mode where no triggering behavior has been detected yet. In the first touch sensing mode, the control circuit 110 provides the first touch driving signal STD1 to the first sensing unit group GSU1 and provides a signal SR to the second sensing unit groups GSU2_1-GSU2_4. The first sensing unit group GSU1 and the second sensing unit groups GSU2_1-GSU2_4 perform mutual capacitance sensing operations. When the electronic device 100 has not yet detected the triggering behavior, the waveform of the signal SR remains unchanged. Therefore, the control circuit 110 may determine that the electronic device 100 has not yet detected the triggering behavior in the first touch sensing mode based on the unchanged waveform of the signal SR.

FIG. 2B shows a waveform diagram of the electronic device 100 detecting triggering behavior in the first touch sensing mode. In the first touch sensing mode, when the electronic device 100 detects the triggering behavior, the waveform of the signal SR is subject to interference and changes. Therefore, the control circuit 110 may determine that the electronic device 100 has detected the triggering behavior in the first touch sensing mode based on the changed waveform of the signal SR. Consequently, the electronic device 100 enters the second touch sensing mode.

FIG. 2C shows a waveform diagram of the electronic device 100 in the second touch sensing mode. In the second touch sensing mode, the control circuit 110 restores the first sensing unit group GSU1 and the second sensing unit groups GSU2_1-GSU2_4 to the sensing units SU. Besides, the control circuit 110 provides the second touch driving signal STD2 to the sensing units SU. In other words, the sensing units SU receive the same second touch driving signal STD2 and perform self-capacitance sensing operations based on the second touch driving signal STD2. The waveform of the second touch driving signal STD2 is different from the waveform of the first touch driving signal STD1 (as shown in FIG. 2A and FIG. 2B).

In this embodiment, each of the first touch driving signal STD1 and the second touch driving signal STD2 includes a plurality of pulses. In some embodiments, each of the first touch driving signal STD1 and the second touch driving signal STD2 includes a plurality of sine waves and/or a plurality of pulses. The waveforms of the first touch driving signal STD1 and the second touch driving signal STD2 should not be construed as limitations in the disclosure.

Figure 3A:
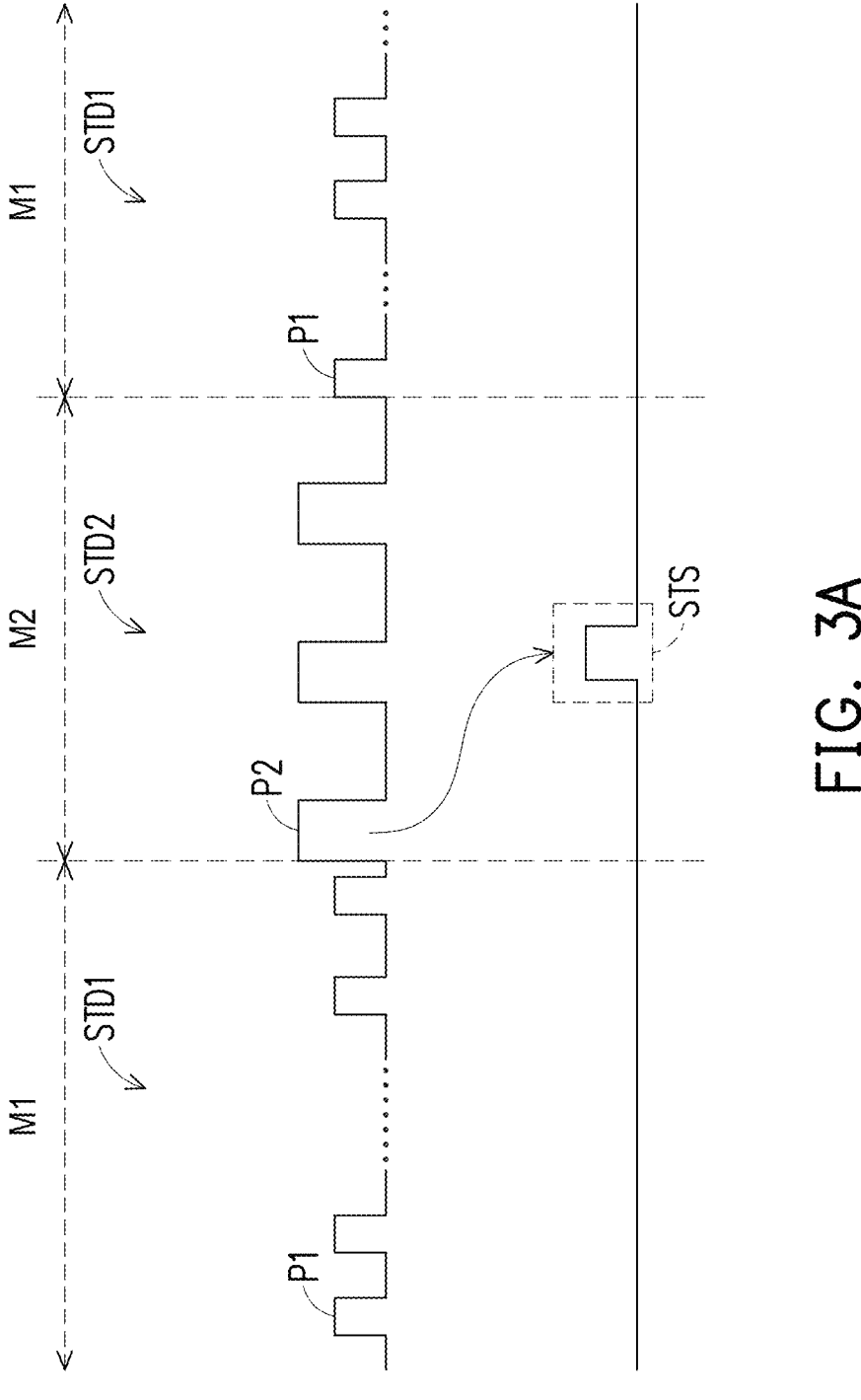
FIG. 3A, FIG. 3B, and FIG. 3C are waveform diagrams illustrated according to an embodiment of the disclosure.

Please refer to FIG. 3A, which is a waveform diagram of the first touch driving signal and the second touch driving signal illustrated according to an embodiment of the disclosure. In this embodiment, in the first touch sensing mode M1, the first touch driving signal STD1 includes a pulse P1. In the second touch sensing mode M2, the second touch driving signal STD2 includes a pulse P2. An amplitude (a height) of the pulse P1 is smaller than an amplitude of the pulse P2. Therefore, the power consumption of the electronic device 100 in the first touch sensing mode is lower than the power consumption of the electronic device in the second touch sensing mode. In this embodiment, a width of the pulse P1 is smaller than a width of the pulse P2. In some embodiments, the width of the pulse P1 may be greater than or equal to the width of the pulse P2.

In addition, when entering the second touch sensing mode M2, the second touch driving signal STD2 begins to be provided. Therefore, touch behavior occurring immediately after entering the second touch sensing mode M2 does not experience the missed pulse P2 of the second touch driving signal STD2. The electronic device 100 generates a touch sensing result STS corresponding to the first pulse P2 of the second touch driving signal STD2. Once the second touch sensing mode M2 ends, the electronic device 100 enters the second touch sensing mode M2.

Figure 3B:
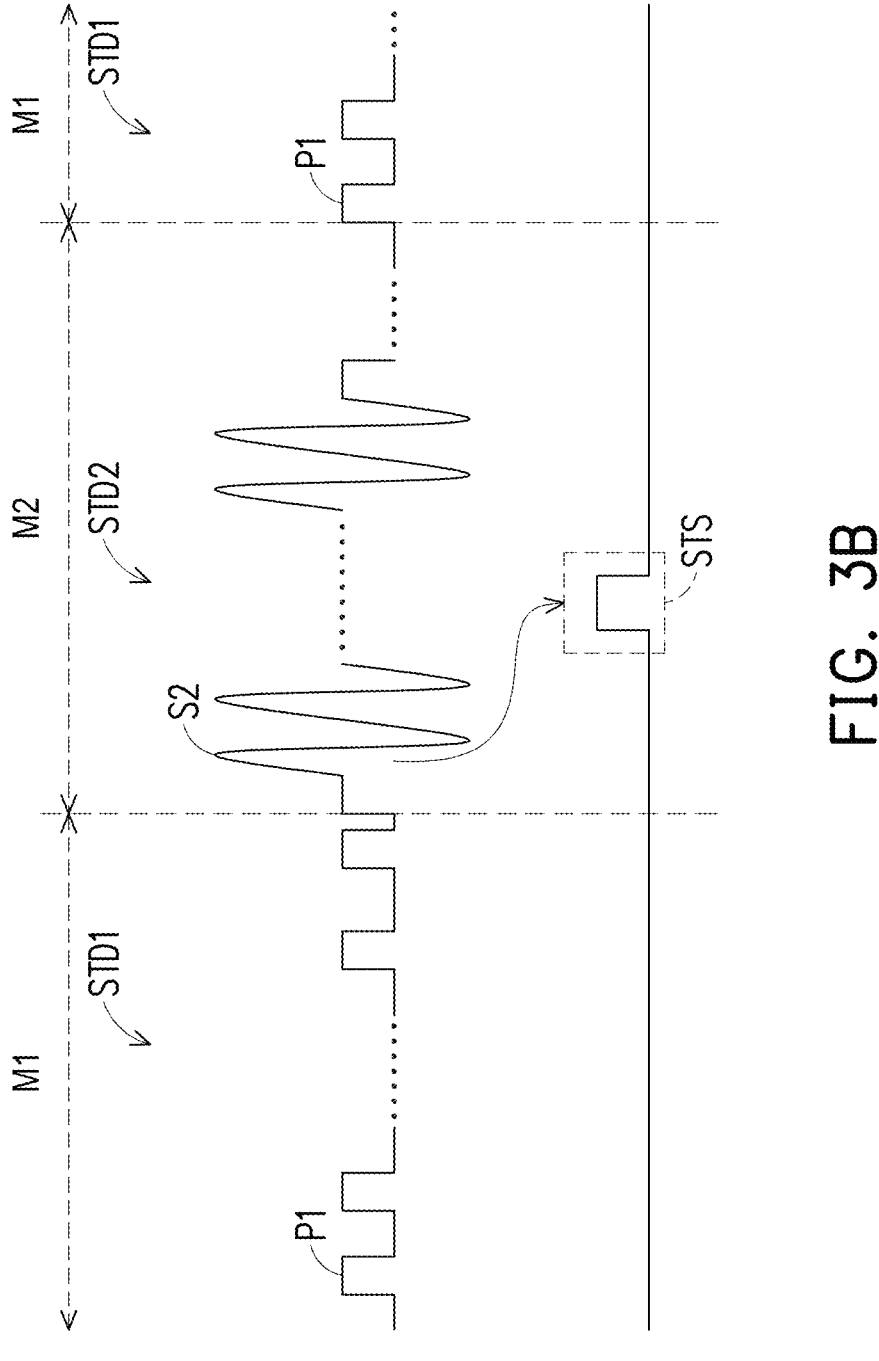

Please refer to FIG. 3B, which is a waveform diagram of the first touch driving signal and the second touch driving signal illustrated according to an embodiment of the disclosure. In this embodiment, in the first touch sensing mode M1, the first touch driving signal STD1 includes the pulse P1. In the second touch sensing mode M2, the second touch driving signal STD2 includes a sine wave S2. The amplitude of the pulse P1 is smaller than an amplitude of the sine wave S2. Therefore, the power consumption of the electronic device 100 in the first touch sensing mode is lower than the power consumption of the electronic device in the second touch sensing mode.

In some embodiments, the first touch driving signal STD1 may include the sine wave. The second touch driving signal STD2 may include the pulse.

In other words, one of the first touch driving signal STD1 and the second touch driving signal STD2 may be a digital signal. The other of the first touch driving signal STD1 and the second touch driving signal STD2 may be an analog signal.

Besides, when entering the second touch sensing mode M2, the second touch driving signal STD2 begins to be provided. Therefore, touch behavior occurring immediately after entering the second touch sensing mode M2 does not experience the missed sine wave S2 of the second touch driving signal STD2. Once the second touch sensing mode M2 ends, the electronic device 100 enters the second touch sensing mode M2.

Figure 3C:
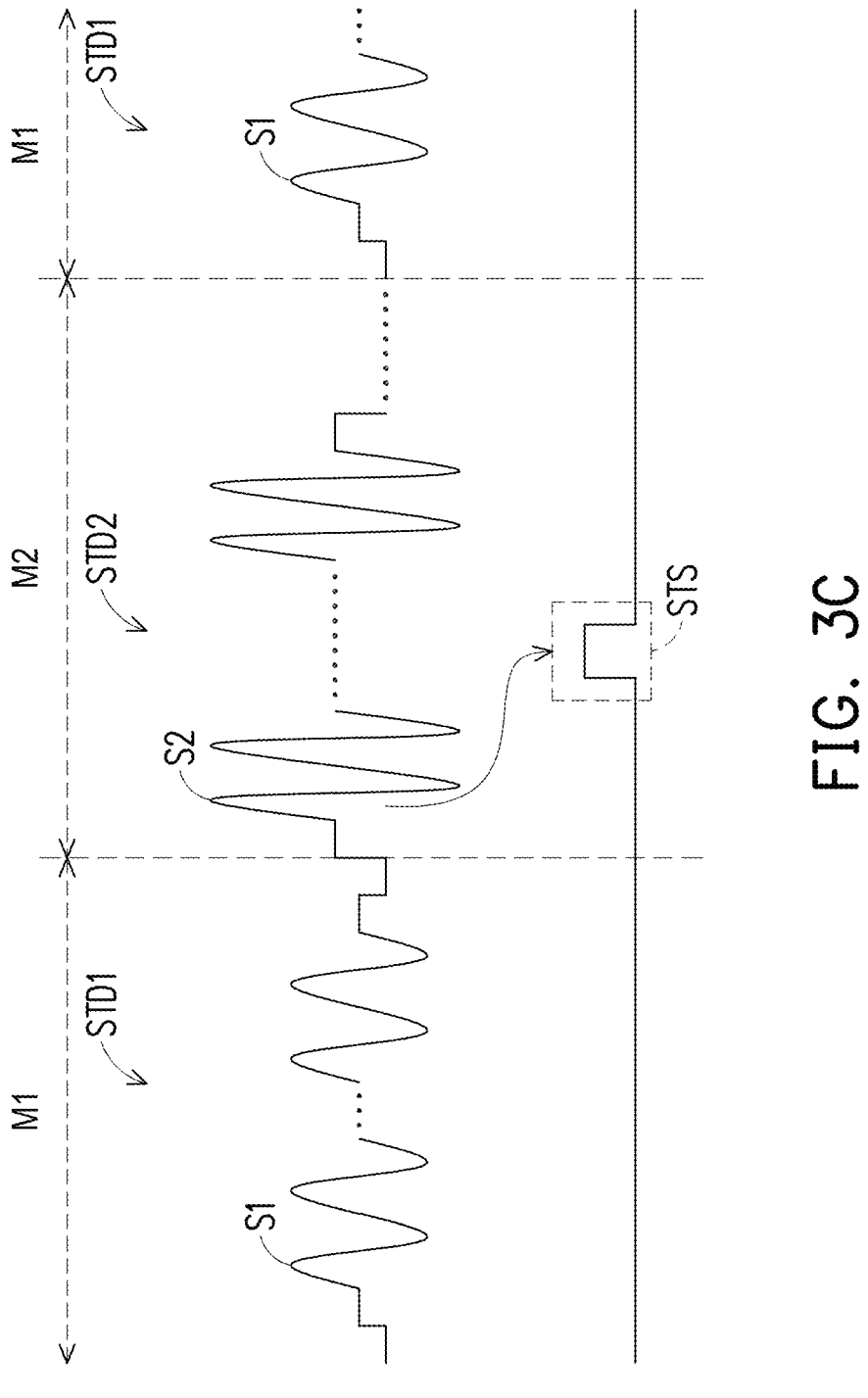

Please refer to FIG. 3C, which is a waveform diagram of the first touch driving signal and the second touch driving signal illustrated according to an embodiment of the disclosure. In this embodiment, in the first touch sensing mode M1, the first touch driving signal STD1 includes the sine wave S1. In the second touch sensing mode M2, the second touch driving signal STD2 includes the sine wave S2. The amplitude of the sine wave S1 is smaller than the amplitude of the sine wave S2. Therefore, the power consumption of the electronic device 100 in the first touch sensing mode is lower than the power consumption of the electronic device in the second touch sensing mode. In this embodiment, a frequency of the sine wave S1 is equal to a frequency of the sine wave S2.

Besides, when entering the second touch sensing mode M2, the second touch driving signal STD2 begins to be provided. Therefore, touch behavior occurring immediately after entering the second touch sensing mode M2 does not experience the missed sine wave S2 of the second touch driving signal STD2. Once the second touch sensing mode M2 ends, the electronic device 100 enters the second touch sensing mode M2.

In this embodiment, the first touch driving signal STD1 and the second touch driving signal STD2 are analog signals, respectively.

In some embodiments, the frequency of the sine wave S1 may be higher than the frequency of the sine wave S2. Therefore, in the first touch sensing mode M1, the electronic device 100 may not be subject to low-frequency noise interference and may not experience errors when performing the non-contact proximity sensing operations.

In some embodiments, the frequency of the sine wave S1 may be lower than the frequency of the sine wave S2.

In some embodiments, the amplitude of the sine wave S1 may be greater than the amplitude of the sine wave S2.

Figure 4:
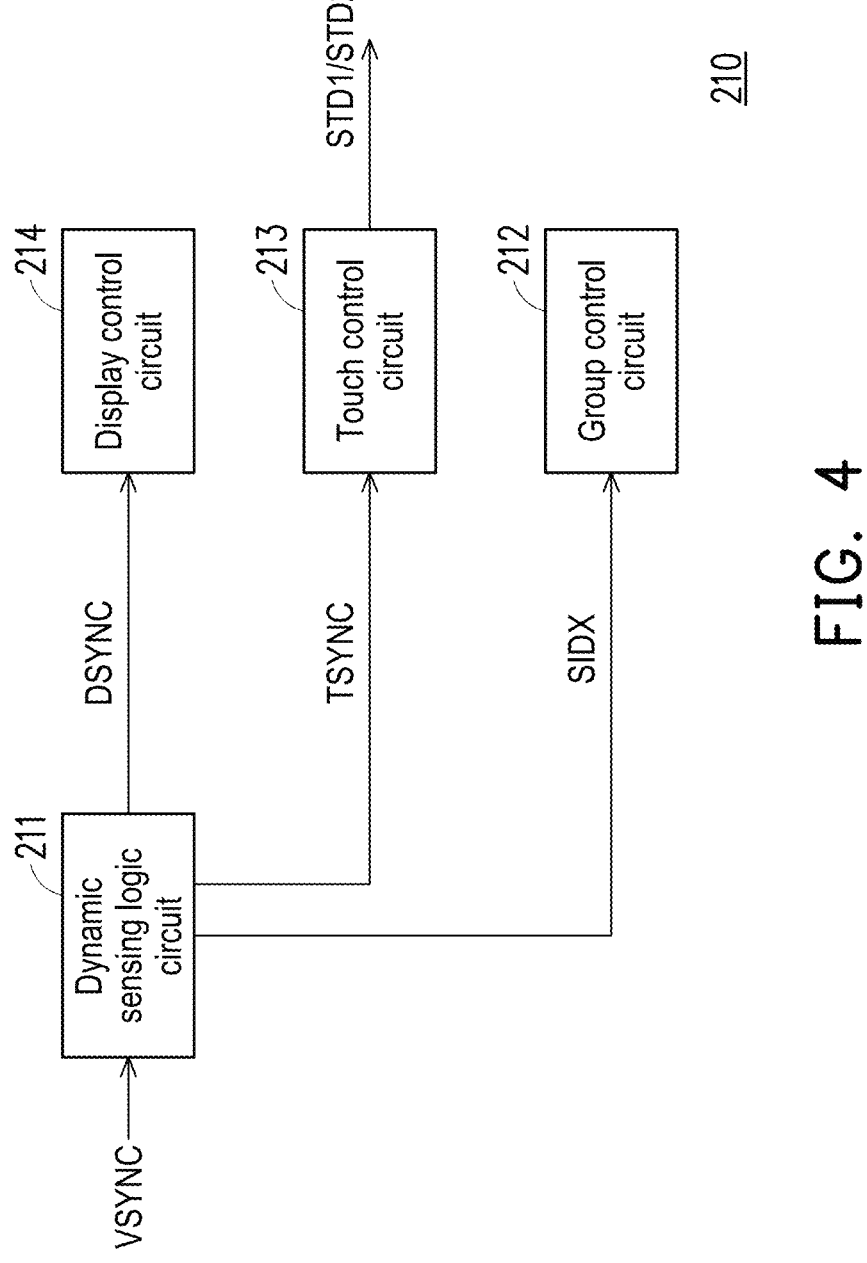
FIG. 4 is a schematic view of a control circuit illustrated according to an embodiment of the disclosure.
Figure 5:
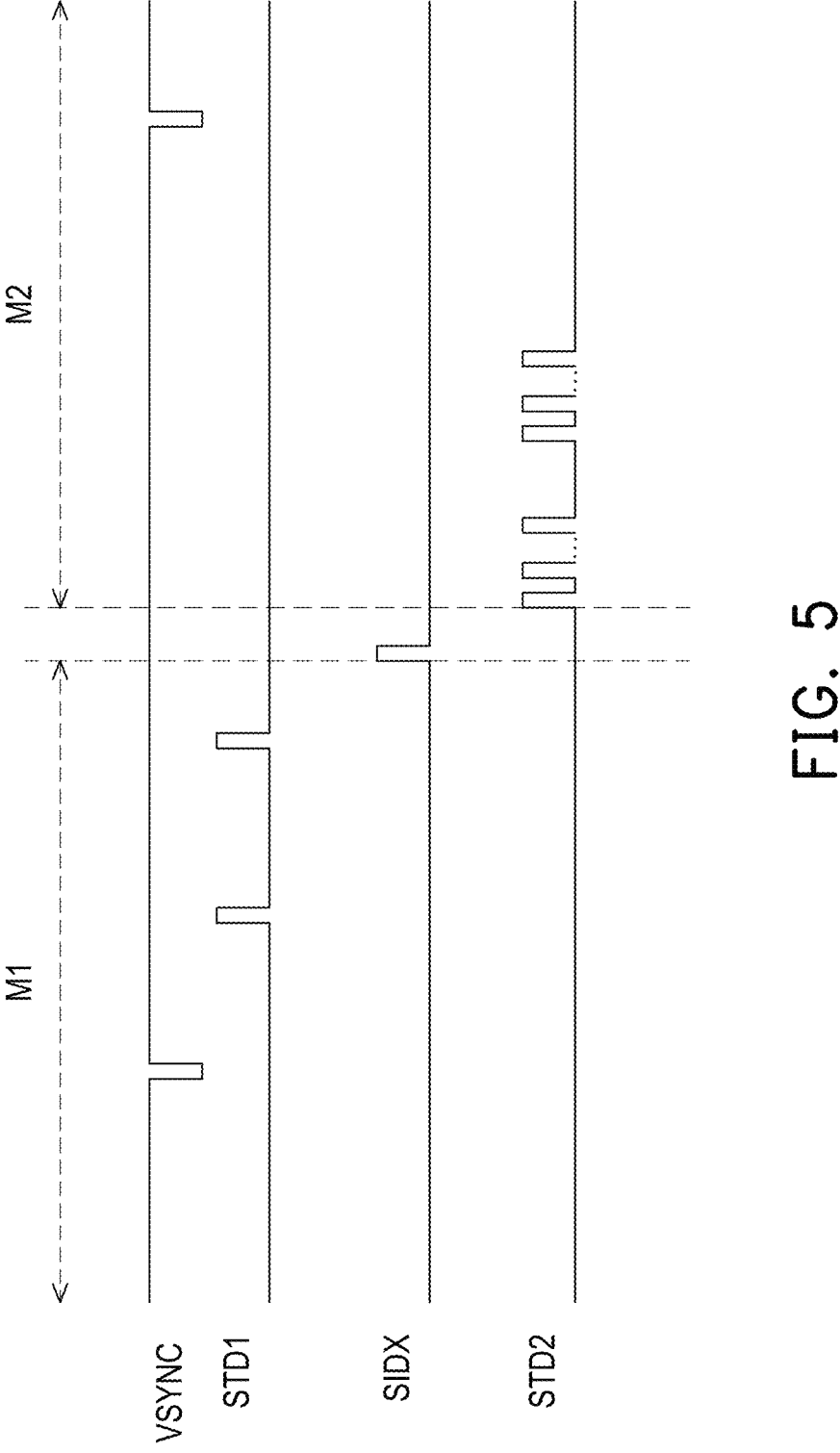
FIG. 5 is a waveform diagram illustrated according to an embodiment of the disclosure.

Please refer to FIG. 1, FIG. 4 and FIG. 5. FIG. 4 is a schematic view of a control circuit illustrated according to an embodiment of the disclosure. FIG. 5 is a waveform diagram illustrated according to an embodiment of the disclosure. In this embodiment, a control circuit 210 is applicable to the electronic circuit 100. The control circuit 210 includes a dynamic sensing logic circuit 211, a group control circuit 212, and a touch control circuit 213. The dynamic sensing logic circuit 211 receives a vertical synchronization signal VSYNC and provides a touch synchronization signal TSYNC based on the vertical synchronization signal VSYNC. The touch control circuit 213 is electrically connected to the dynamic sensing logic circuit 211 and the sensing units SU. The touch control circuit 213 determines to provide one of the first touch driving signal STD1 and the second touch driving signal STD2 based on the touch synchronization signal TSYNC.

In this embodiment, the dynamic sensing logic circuit 211 further provides an index signal SIDX based on the first touch sensing mode M1 and the second touch sensing mode M2. In this embodiment, the group control circuit 212 groups the sensing units SU into the first sensing unit group GSU1 and the second sensing unit groups GSU2_1-GSU2_4 or restores the first sensing unit group GSU1 and the second sensing unit groups GSU2_1-GSU2_4 back to the sensing units SU based on the index signal SIDX.

For instance, when transitioning from the first touch sensing mode M1 to the second touch sensing mode M2, the dynamic sensing logic circuit 211 provides the index signal SIDX with a first waveform. When the group control circuit 212 receives the index signal SIDX with the first waveform, the group control circuit 212 restores the first sensing unit group GSU1 and the second sensing unit groups GSU2_1-GSU2_4 back to the sensing units SU. At this time, the touch control circuit 213 provides the second touch driving signal STD2 to the sensing units SU based on the touch synchronization signal TSYNC.

When transitioning from the second touch sensing mode M2 to the first touch sensing mode M1, the dynamic sensing logic circuit 211 provides the index signal SIDX with a second waveform. When the group control circuit 212 receives the index signal SIDX with the second waveform, the group control circuit 212 groups the sensing units SU into the first sensing unit group GSU1 and the second sensing unit groups GSU2_1-GSU2_4. At this time, the touch control circuit 213 provides the first touch driving signal STD1 to the first sensing unit group GSU1 based on the touch synchronization signal TSYNC.

In this embodiment, the electronic circuit 100 may be, for instance, a touch display device. Therefore, the control circuit 210 further includes a display control circuit 214. The display control circuit 214 is electrically connected to a display panel (not shown) of the electronic circuit 100 and the dynamic sensing logic circuit 211. The dynamic sensing logic circuit 211 provides a display synchronization signal DSYNC based on the vertical synchronization signal VSYNC. The display control circuit 214 controls the display panel based on the display synchronization signal DSYNC.

In this embodiment, the control circuit 210 may be, for instance, a touch and display driver integration (TDDI).

In some embodiments, the control circuit 210 may not include the display control circuit 214.

Figure 6:
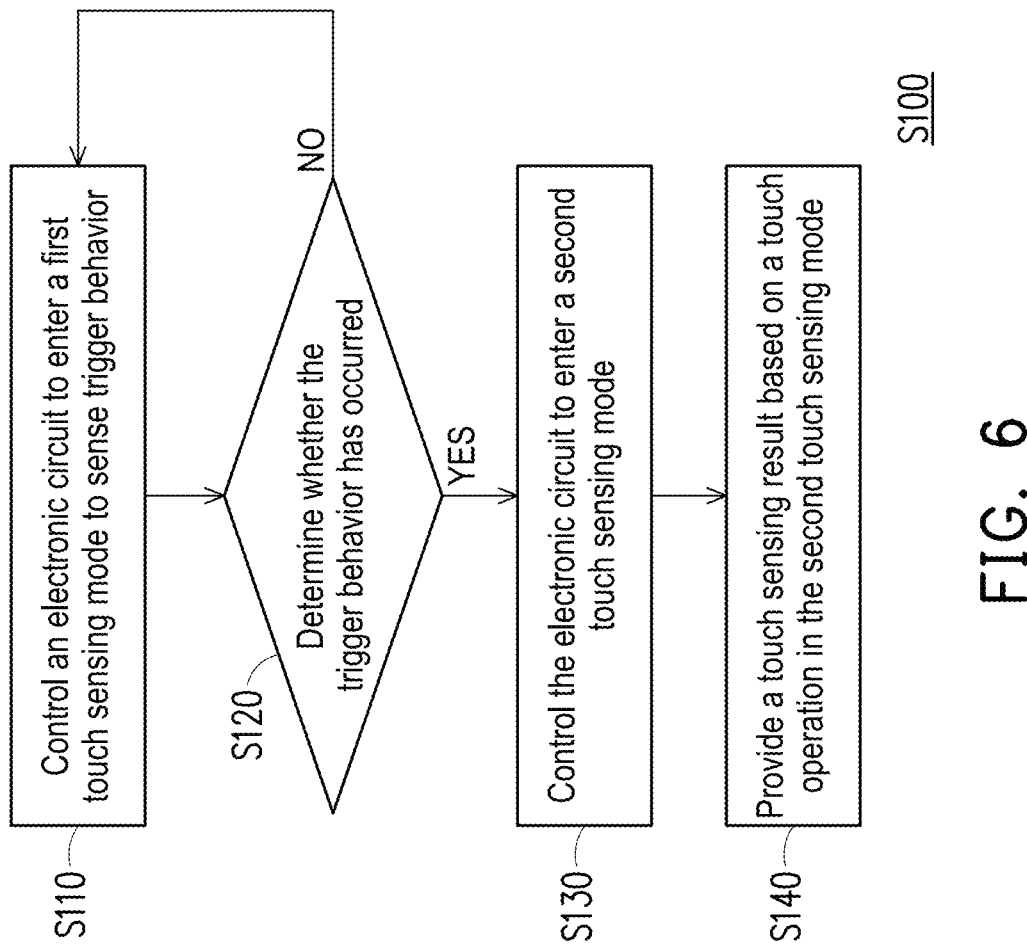
FIG. 6 is an operation flowchart illustrated according to an embodiment of the disclosure.

Please refer to FIG. 1 and FIG. 6. FIG. 6 is an operation flowchart illustrated according to an embodiment of the disclosure. In this embodiment, an operation process S100 is applicable to the electronic circuit 100. The operation process S100 includes steps S110 to S140. In step S110, the electronic circuit 100 enters the first touch sensing mode to sense trigger behavior. In step S110, the control circuit 110 groups the sensing units SU into the first sensing unit group GSU1 and the second sensing unit groups GSU2_1-GSU2_4 and provides the first touch driving signal STD1 to the first sensing unit group GSU1. The trigger behavior may be, for instance, non-contact proximity sensing behavior or touch behavior.

In step S120, the electronic circuit 100 determines whether the trigger behavior has occurred. When the trigger behavior has not occurred, the electronic circuit 100 returns to the operation in step S110.

On the other hand, when the trigger behavior occurs, the control circuit 110 controls the electronic circuit 100 to enter the second touch sensing mode in step S130. In the second touch sensing mode, the control circuit 110 restores the first sensing unit group GSU1 and the second sensing unit groups GSU2_1-GSU2_4 to the sensing units SU and provides the second touch driving signal STD2 to the sensing units SU. In step S140, the electronic circuit 100 provides a touch sensing result based on the touch operation in the second touch sensing mode.

Please refer to FIG. 1 and FIG. 7. FIG. 7 is an operation flowchart illustrated according to an embodiment of the disclosure. In this embodiment, an operation process S200 is applicable to the electronic circuit 100. The operation process S200 includes steps S210 to S270. The electronic circuit 100 may be, for instance, an automotive electronic device. In step S210, the automotive host is powered on. The electronic circuit 100 is activated to enter initialization settings in step S220 and determines whether it is operated to enter the first touch sensing mode in step S230. In step S230, the electronic circuit 100 may provide a notification about whether to enter the first touch sensing mode. For instance, the electronic circuit 100 may display a notification on the display panel regarding entering the first touch sensing mode through. A user may decide whether to control the electronic circuit 100 to enter the first touch sensing mode based on the notification. When the electronic circuit 100 is not operated to enter the first touch sensing mode, the electronic circuit 100 enters the second touch sensing mode in step S240 and provides a touch sensing result based on the touch operation in the second touch sensing mode in step S250.

On the other hand, when the electronic circuit 100 is operated to enter the first touch sensing mode, the electronic circuit 100 enters the first touch sensing mode in step S260 and senses the trigger behavior and provides operations corresponding to the trigger behavior in step S270. The implementation details of step S270 have been clearly explained in the embodiments depicted in FIG. 1 to FIG. 5 and steps S110 to S140 in FIG. 6 and thus will not be repeated hereinafter.

Figure 8:
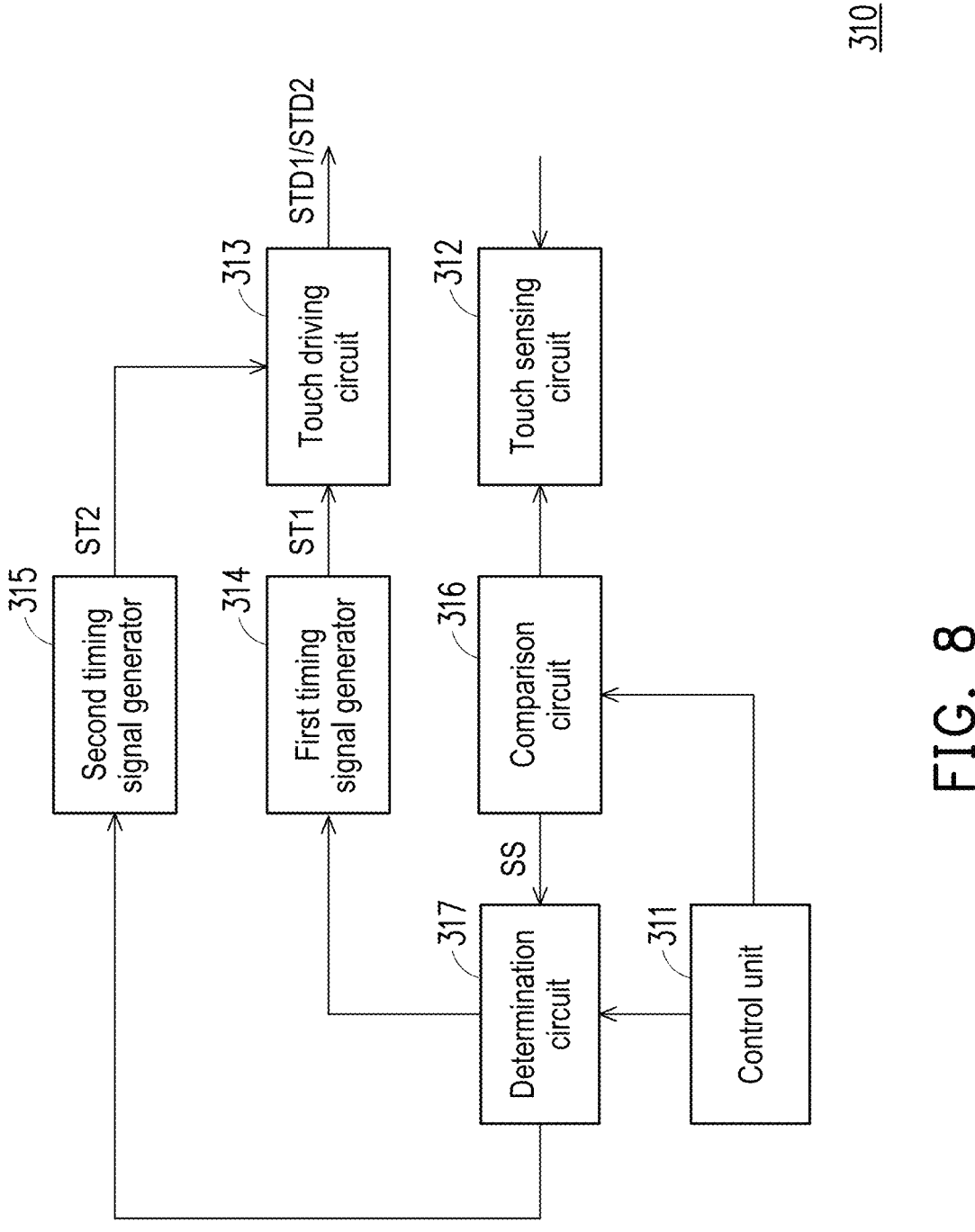
FIG. 8 is a schematic view of a sensing operation of a control circuit illustrated according to an embodiment of the disclosure.

Please refer to FIG. 1 and FIG. 8. FIG. 8 is a schematic view of a sensing operation of a control circuit illustrated according to an embodiment of the disclosure. In this embodiment, a control circuit 310 is applicable to the electronic circuit 100. The control circuit 310 includes a control unit 311, a touch sensing circuit 312, a touch driving circuit 313, a first timing signal generator 314, a second timing signal generator 315, a comparison circuit 316, and a determination circuit 317. The control unit 311 is electrically connected to the comparison circuit 316 and the determination circuit 317. The touch sensing circuit 312 is electrically connected to the sensing units SU and the comparison circuit 316. The touch driving circuit 313 is electrically connected to the sensing units SU, the first timing signal generator 314, and the second timing signal generator 315. The comparison circuit 316 is electrically connected to the determination circuit 317. The determination circuit 317 is electrically connected to the first timing signal generator 314 and the second timing signal generator 315.

In this embodiment, the control unit 311 drives the comparison circuit 316 and the determination circuit 317. When the electronic circuit 100 enters the first touch sensing mode, the determination circuit 317 enables the first timing signal generator 314 and disables the second timing signal generator 315. The first timing signal generator 314 provides a first timing signal ST1. The touch driving circuit 313 provides the first touch driving signal STD1 in response to the first timing signal ST1. In the first touch sensing mode, the comparison circuit 316 receives a result corresponding to the trigger behavior (e.g., non-contact proximity sensing behavior or touch behavior) through the touch sensing circuit 312. The comparison circuit 316 generates a sensing signal SS based on the comparison between the result and a reference signal. The determination circuit 317 determines whether to enable one of the first timing signal generator 314 and the second timing signal generator 315 based on the sensing signal SS.

For instance, the determination circuit 317 determines whether a voltage value of the sensing signal SS is greater than a threshold. When the voltage value of the sensing signal SS is less than the threshold, the determination circuit 317 determines that no trigger behavior has occurred in the electronic circuit 100. Therefore, the determination circuit 317 enables the first timing signal generator 314 and disables the second timing signal generator 315. The touch driving circuit 313 continues to provide the first touch driving signal STD1.

On the other hand, when the voltage value of the sensing signal SS is less than the threshold, the determination circuit 317 determines that trigger behavior has occurred in the electronic circuit 100. The electronic circuit 100 enters the second touch sensing mode. Therefore, the determination circuit 317 enables the second timing signal generator 315 and disables the first timing signal generator 314. The second timing signal generator 315 provides a second timing signal ST2. The touch driving circuit 313 provides the second touch driving signal STD2 in response to the second timing signal ST2.

Moreover, the control unit 311 is electrically connected to the first timing signal generator 314 and the second timing signal generator 315. The control unit 311 may adjust or set the first timing signal ST1 of the first timing signal generator 314 and the second timing signal ST2 of the second timing signal generator 315.

To sum up, the first touch driving signal provided by the control circuit of the electronic circuit operating in the first touch sensing mode is different from the second touch driving signal provided in the second touch sensing mode. Once entering the second touch sensing mode, the second touch driving signal is provided anew. Therefore, the touch behavior that occurs immediately after entering the second touch sensing mode does not experience the missed pulse of the second touch driving signal. As a result, the electronic device may reduce the latency of the touch operations. Besides, the first amplitude of the first touch driving signal is smaller than the second amplitude of the second touch driving signal. Consequently, the power consumption of the electronic device in the first touch sensing mode is lower than the power consumption of the electronic device in the second touch sensing mode.

The above embodiments simply serve to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. An electronic device, comprising:
a control circuit, configured to switch between a first touch sensing mode of the electronic device and a second touch sensing mode of the electronic device; and
a plurality of sensing units, electrically connected to the control circuit,
wherein a first amplitude of a first touch driving signal provided by the control circuit operating in the first touch sensing mode is smaller than a second amplitude of a second touch driving signal provided by the control circuit operating in the second touch sensing mode,
wherein the control circuit in the first touch sensing mode groups the sensing units into a first sensing unit group and a plurality of second sensing unit groups, wherein in the first touch sensing mode, when triggering behavior is sensed, the control circuit controls the electronic device to enter the second touch sensing mode and restores the first sensing unit group and the second sensing unit groups back to the sensing units, wherein the first touch sensing mode is a mutual-capacitance sensing mode, and wherein the second touch sensing mode is a self-capacitance sensing mode.

2. The electronic device according to claim 1, wherein the second sensing unit groups are respectively adjacent to the first sensing unit group.

3. The electronic device according to claim 1, wherein the second sensing unit groups collectively surround the first sensing unit group.

4. The electronic device according to claim 1, wherein the control circuit in the first touch sensing mode provides the first touch driving signal to the first sensing unit group.

5. The electronic device according to claim 1, wherein a frequency of the first touch driving signal is higher than a frequency of the second touch driving signal.

6. The electronic device according to claim 1, wherein the first touch driving signal comprises a plurality of sine waves.

7. The electronic device according to claim 1, wherein the first touch driving signal comprises a plurality of pulses.

8. The electronic device according to claim 1, wherein the second touch driving signal comprises a plurality of sine waves.

9. The electronic device according to claim 1, wherein the second touch driving signal comprises a plurality of pulses.

10. The electronic device according to claim 1, wherein the first touch driving signal and the second touch driving signal are analog signals, respectively.

11. The electronic device according to claim 1, wherein one of the first touch driving signal and the second touch driving signal is a digital signal, and the other one of the first touch driving signal and the second touch driving signal is an analog signal.

12. The electronic device according to claim 1, wherein the control circuit comprises:

a dynamic sensing logic circuit, configured to provide an index signal according to the first touch sensing mode and the second touch sensing mode.

13. The electronic device according to claim 12, wherein the control circuit further comprises:

a group control circuit, electrically connected to the dynamic sensing logic circuit and configured to group the sensing units into the first sensing unit group and the plurality of second sensing unit groups or restore the first sensing unit group and the second sensing unit groups back to the sensing units according to the index signal.

14. The electronic device according to claim 12, wherein the control circuit further comprises:

a touch control circuit, electrically connected to the dynamic sensing logic circuit, wherein the dynamic sensing logic circuit provides a touch synchronization signal according to a vertical synchronization signal, and wherein the touch control circuit determines to provide one of the first touch driving signal and the second touch driving signal according to the touch synchronization signal.

15. The electronic device according to claim 1, wherein the control circuit comprises:

a first timing signal generator;

a second timing signal generator;

a touch driving circuit, electrically connected to the first timing signal generator and the second timing signal generator; and a determination circuit, electrically connected to the first timing signal generator and the second timing signal generator, wherein in the first touch sensing mode, the determination circuit enables the first timing signal generator and disables the second timing signal generator, such that the first timing signal generator provides a first timing signal, and the touch driving circuit provides the first touch driving signal in response to the first timing signal.

16. The electronic device according to claim 15, wherein in the second touch sensing mode:

the determination circuit enables the second timing signal generator and disables the first timing signal generator, such that the second timing signal generator provides a second timing signal, and the touch driving circuit provides the second touch driving signal in response to the second timing signal.

* * * * *